United States Patent Office 3,282,732
Patented Nov. 1, 1966

3,282,732
METHOD OF MAKING A SILVER
OXIDE ELECTRODE
Charles J. Bradley, Asbury Park, and Kenneth E. Meade, Oceanport, N.J., assignors to the United States of America as represented by the Secretary of the Army
No Drawing. Filed Nov. 1, 1963, Ser. No. 320,970
3 Claims. (Cl. 136—20)

The invention described herein may be manufactured and used by or for the Government for governmental purposes without the payment of any royalty thereon.

This invention relates in general to a method of making an electrode, and in particular, to a method of making a silver oxide electrode.

Silver oxide electrodes are often used as the positive electrode of a primary or secondary battery such as the zinc-silver battery that is used in missiles for supplying power to the guidance and hydraulic systems within the missile. The best known method of making the silver oxide electrode is the so called electrolytic method. According to that method, monovalent silver oxide ($Ag_2O$) powder is mixed with water and the mixture pasted on to a silver grid. The pasted grid is dried and the silver monoxide thermally decomposed to silver. The grid bearing the silver deposit is then pressed to bind the silver particles to the grid and the plate then electrolytically oxidized to obtain the desired divalent silver oxide or silver peroxide (AgO) electrode. The above method is disadvantageous primarily in that a costly manufacture is involved.

An attempt has been made to reduce the cost of manufacture by directly mixing divalent silver oxide (AgO) powder with resinous binder and then pasting the resulting mixture directly on to the silver grid. However, that method resulted in an electrode having poor mechanical characteristics.

An object of this invention is to provide an improved method of making a divalent silver oxide electrode in which the disadvantages of the aforementioned methods are overcome. A still further object of this invention is to provide a method of making a divalent silver oxide electrode that has greater uniformity in performance, superior voltage characteristics, higher utilization of active materials, and greater economy in production than the divalent silver oxide electrodes made according to the above described methods.

According to the present method, a plastic binder in a relatively non-volatile solution such as an aqueous solution of carboxy methyl cellulose is first applied to the silver grid by any conventional method as brushing, flush pasting, etc. Immediately thereafter, divalent silver oxide (AgO) is applied to the grid and mechanically levelled out. The grid is then pressed at a pressure of at least 1000 pounds per square inch to form the completed electrode in which the carboxy methyl cellulose binder solution is uniformly distributed throughout the active material by the pressing operation.

The following example is illustrative of the invention.
A 1 percent aqueous solution of carboxy methyl cellulose is flush pasted onto a 4–0 mesh silver grid measuring 2″ x 1⅝″. Immediately thereafter, 4 grams of divalent silver oxide is applied to the grid and smoothed out by hand levelling. The grid is then pressed at a pressure of 3,000 pounds per square inch to form the completed electrode. The electrode was found to be mechanically stable and superior in electrical performance to the divalent silver oxide electrode made by the electrolytic method.

In the above example, for mechanical ease of handling, the grid may be placed on an aluminum sheet the size of the grid and that assembly held in a pressing jig. The grid is easily removed from the sheet after pressing.

If greater conductivity in the electrode is desired, a material such as graphite or carbon black can be mixed with the active material prior to application to the grid.

The amount of active material added will depend on the overall size of the grid and the amount of ampere hour capacity desired in the completed electrode. Thus, in the above example, anywhere from 2 grams to 6 grams of divalent silver oxide could have been applied to the grid.

The above described technique can be applied in making other electrodes using other active materials as for example, mercuric oxide.

The nature of the method makes it amenable to a continuous method of producing the electrode as for example, by unwinding a roll of continuous grid material onto a belt containing apparatus for applying binder solution, active material, pressure, etc.

The foregoing description is to be considered merely as illustrative of the invention and not in limitation thereof.

What is claimed is:
1. The method of making a divalent silver oxide electrode for a battery comprising pasting a silver grid with an aqueous solution of carboxy methyl cellulose, immediately thereafter applying divalent silver oxide to the grid, mechanically levelling out the pasted grid, and applying pressure of at least 1000 pounds per square inch to the pasted grid.

2. The method according to claim 1 wherein an electrically conducting material is added with the silver oxide to the grid.

3. The method of making a divalent silver oxide electrode for a battery comprising pasting a 4–0 mesh silver grid with a 1 percent aqueous solution of carboxy methyl cellulose, immediately thereafter applying 2 to 6 grams of divalent silver oxide to the grid, mechanically levelling out the pasted grid, and applying 3,000 pounds per square inch pressure to the grid.

References Cited by the Examiner
UNITED STATES PATENTS

| | | | |
|---|---|---|---|
| 3,053,924 | 9/1962 | Strauss et al. | 136—30 |
| 3,069,486 | 12/1962 | Solomon et al. | 136—30 |
| 3,120,457 | 2/1964 | Duddy | 136—30 X |
| 3,185,591 | 5/1965 | Bartfai et al. | 136—30 X |

WINSTON A. DOUGLAS, *Primary Examiner.*

B. J. OHLENDORF, *Assistant Examiner.*